United States Patent [19]

Klaras et al.

[11] Patent Number: 5,365,532
[45] Date of Patent: Nov. 15, 1994

[54] CAVITY DUMP LASER AMPLITUDE STABILIZATION

[75] Inventors: Louis F. Klaras, Redondo Beach; Kuei-Ru Chien, Cerritos, both of Calif.

[73] Assignee: Hughes Aircraft Company, Los Angeles, Calif.

[21] Appl. No.: 958,623

[22] Filed: Oct. 9, 1992

[51] Int. Cl.⁵ .............................................. H01S 3/13
[52] U.S. Cl. ........................................ 372/31; 372/10; 372/30
[58] Field of Search .................. 372/9, 10, 12, 29, 30, 372/31, 11

[56] References Cited

U.S. PATENT DOCUMENTS

| | | | |
|---|---|---|---|
| 3,571,744 | 3/1971 | Hook et al. | 372/12 X |
| 3,747,019 | 7/1973 | Koechner et al. | 372/30 |
| 3,820,038 | 6/1974 | Tomlinson | 372/12 |
| 4,174,504 | 11/1979 | Chenausky et al. | 372/11 |
| 5,001,717 | 3/1991 | Mayer et al. | 372/12 X |
| 5,204,867 | 4/1993 | Koschmann | 372/31 X |

Primary Examiner—John D. Lee
Attorney, Agent, or Firm—Hugh P. Gortler; M. W. Sales; W. K. Denson-Low

[57] ABSTRACT

An amplitude stabilization circuit for a $CO_2$ laser employing a filter for generating a Q-switched baseband video pulse representing intracavity laser flux, a comparator to detect when the video pulse and flux reach a selected level, and logic timing circuitry for timing generation of a Q-switch discharge pulse to occur at the peak of the intracavity flux. A second comparator is advantageously used to generate a sample signal for frequency locking from the baseband video pulse.

21 Claims, 6 Drawing Sheets

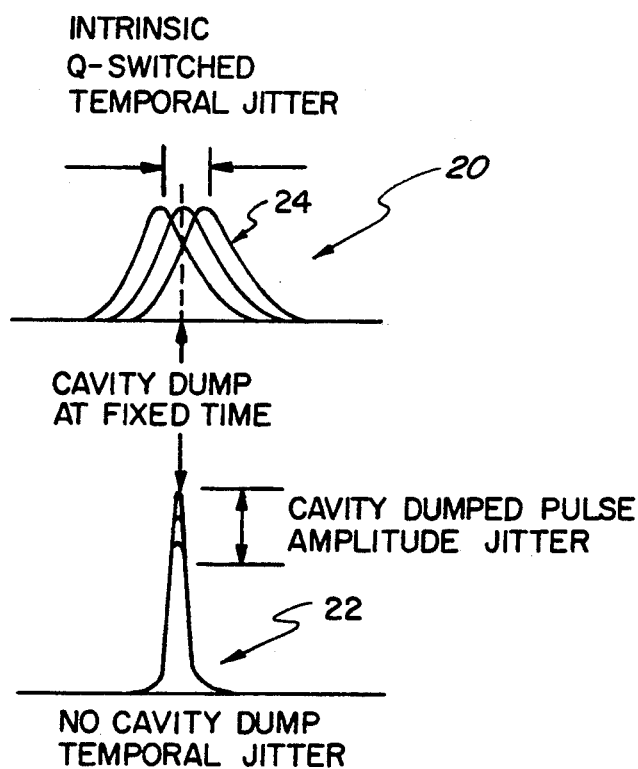
FIG. 2
FIG. 3
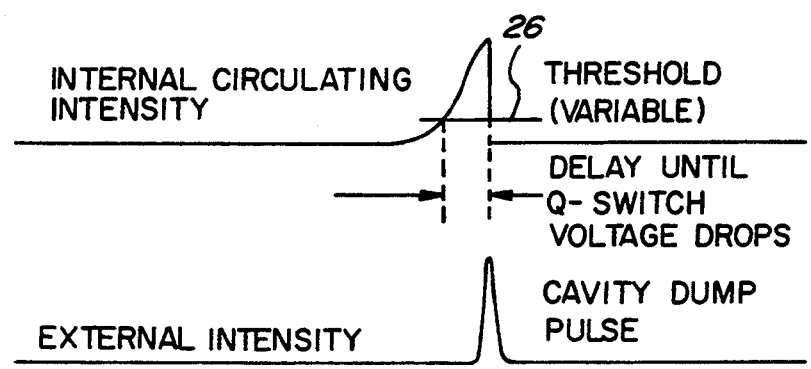
FIG. 4
FIG. 5

CAVITY DUMP LASER AMPLITUDE STABILIZATION

BACKGROUND OF THE INVENTION

1. Field of the Invention

The subject invention relates to lasers and, more particularly, to a method and apparatus for stabilizing the output amplitude of cavity dump lasers.

2. Description of Related Art

Present $CO_2$ laser radar transmitters use the short pulse waveform. The short pulse is generated from a $CO_2$ waveguide laser using a cavity-dump Q-switch technique. The statistical variations in the $CO_2$ spontaneous emission starting field and the inherent low gain of $CO_2$ lasers cause amplitude jitter in the laser. Such amplitude jitter decreases the laser sensor's probability of detection and increases the false alarm rate.

SUMMARY OF THE INVENTION

It is therefore an object of the invention to provide a method and apparatus for correcting laser amplitude jitter;

It is another object of the invention to stabilize the output amplitude of $CO_2$ lasers; and It is another object of the invention to generate improved sample/hold timing for frequency locking local and transmitter oscillators of the laser.

This invention implements a threshold detection circuit that senses the laser intracavity circulating flux and then triggers the cavity dump at the peak of circulating flux, thereby eliminating the amplitude jitter of the pulsed $CO_2$ laser.

The output of a heterodyne detector can be filtered to generate a baseband Q-switch video pulse. The baseband Q-switch video pulse is used to derive both a threshold detect signal and a sample/hold signal for frequency locking. This approach assures that the sample/hold timing for frequency locking is dependent only on the transmit laser Q-switch signal, rather than the RF heterodyne signal, which must be envelope detected.

BRIEF DESCRIPTION OF THE DRAWINGS

The just-summarized invention will now be described in detail in conjunction with the drawings, of which:

FIG. 2 includes two related graphs which illustrate fixed-time cavity dumping;

FIGS. 3-5 are graphs showing, respectively, simultaneous Q-switch voltage, internal circulating intensity, and external intensity versus time according to the preferred embodiment;

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide readily implementable and accurate circuitry for $CO_2$ laser amplitude stabilization.

Figure 1:
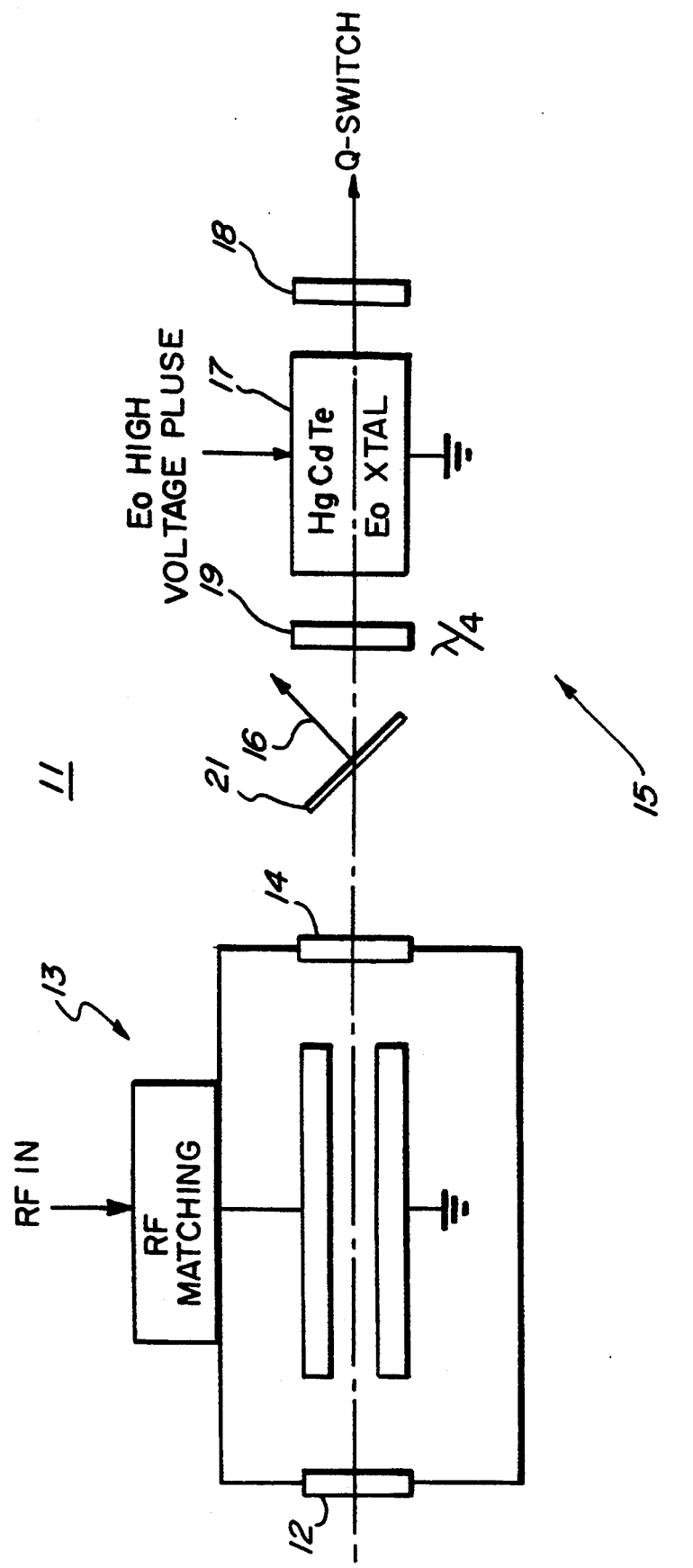
FIG. 1 illustrates a typical cavity dump resonator.

The conventional method for generating short pulses from a CW laser is to use the cavity dump technique. As shown in FIG. 1, a cavity dump resonator 11 includes a gain medium section 13 and a Q-switch section 15. The gain medium section 13 includes a total reflector (PZT) 12 and an output window 14. The Q-switch section 15 is formed by a Q-switch 17, a quarter-wave ($\frac{1}{4}\lambda$) plate 19, and a polarizer 21. The Q-switch 17 is preferably an CdTe electro-optic crystal (EO) switch.

A low Q resonator is begun by properly biasing the quarter-wave plate 19 in which the lasing action is diminished. A fast rise time quarter-wave voltage is then applied to the CdTe EO switch 17 to form a high Q resonator condition that allows the resonator flux to build. At the peak of the resonator flux, the EO voltage pulse is terminated (back to the low Q condition), which switches the lasing pulse polarization state 90 degrees and outcouples the laser cavity dump pulse 16 off the thin film intraresonator polarizer (TFP) 21.

In conventional operation of a laser such as shown in FIG. 1, the peak of the internal Q-switched radiation exhibits temporal jitter caused by statistical variations in the spontaneous emission starting field. Such jitter among pulse peaks 24 is illustrated in the upper graph 20 of FIG. 2, a graph of radiation intensity versus time. The traditional method of cavity dumping at a fixed time after the Q-switch 17 has been opened results in amplitude jitter of the cavity dumped output. Such amplitude jitter is shown in the lower graph 22 of FIG. 2, a graph of radiation intensity versus time aligned in time with the upper graph 20.

Figure 6:
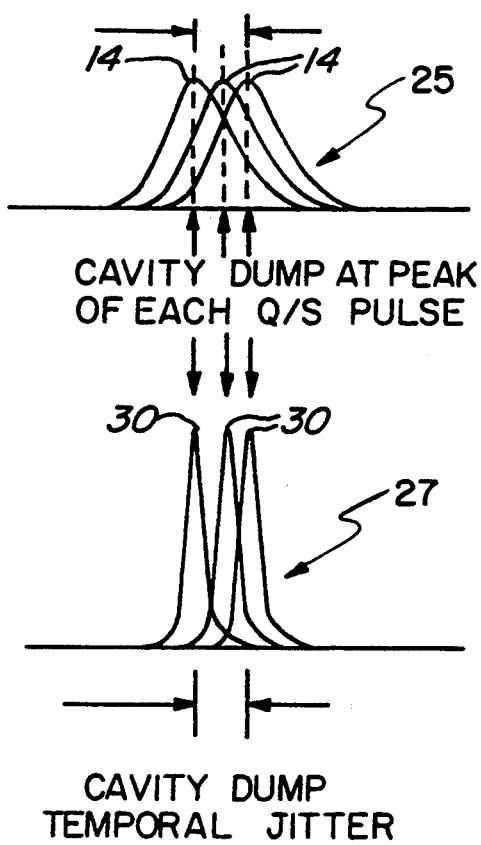
FIG. 6 includes two related graphs which illustrate constant amplitude cavity dumping according to the preferred embodiment.

FIGS. 3-5 illustrate the principle of cavity dump operation with threshold detection to produce constant amplitude output pulses. In FIG. 3, the Q-switch 17 has been opened and the internal circulating intensity builds toward a maximum. In FIG. 4, the building intensity is sensed by a detector and, at some threshold 26, the detector tells the Q-switch 17 to turn off. When the Q-switch 17 turns off, the voltage drops and a short pulse (cavity dump) results as shown in FIG. 5. When the amplitude of the internal radiation is sensed, as shown in FIG. 4, the circulating radiation can be dumped at the peak of its intensity as shown in FIGS. 5 and 6. FIG. 6 particularly illustrates the maintenance of constant amplitude of the peaks 30 of the cavity dumped pulses (lower graph 27) despite the temporal variations in occurrence of the peaks 14 (upper graph 25). Operation in this fashion eliminates the amplitude jitter of the cavity dump output.

The pulsed output of the laser is maximized when cavity dumping occurs at the peak of the circulating flux. In implementing the preferred embodiment, delays in the switching electronics make it necessary to detect the buildup of the internal radiation, i.e., perform the threshold detection, before the internal radiation reaches the maximum. This operation will be explained in more detail below.

Figure 7:
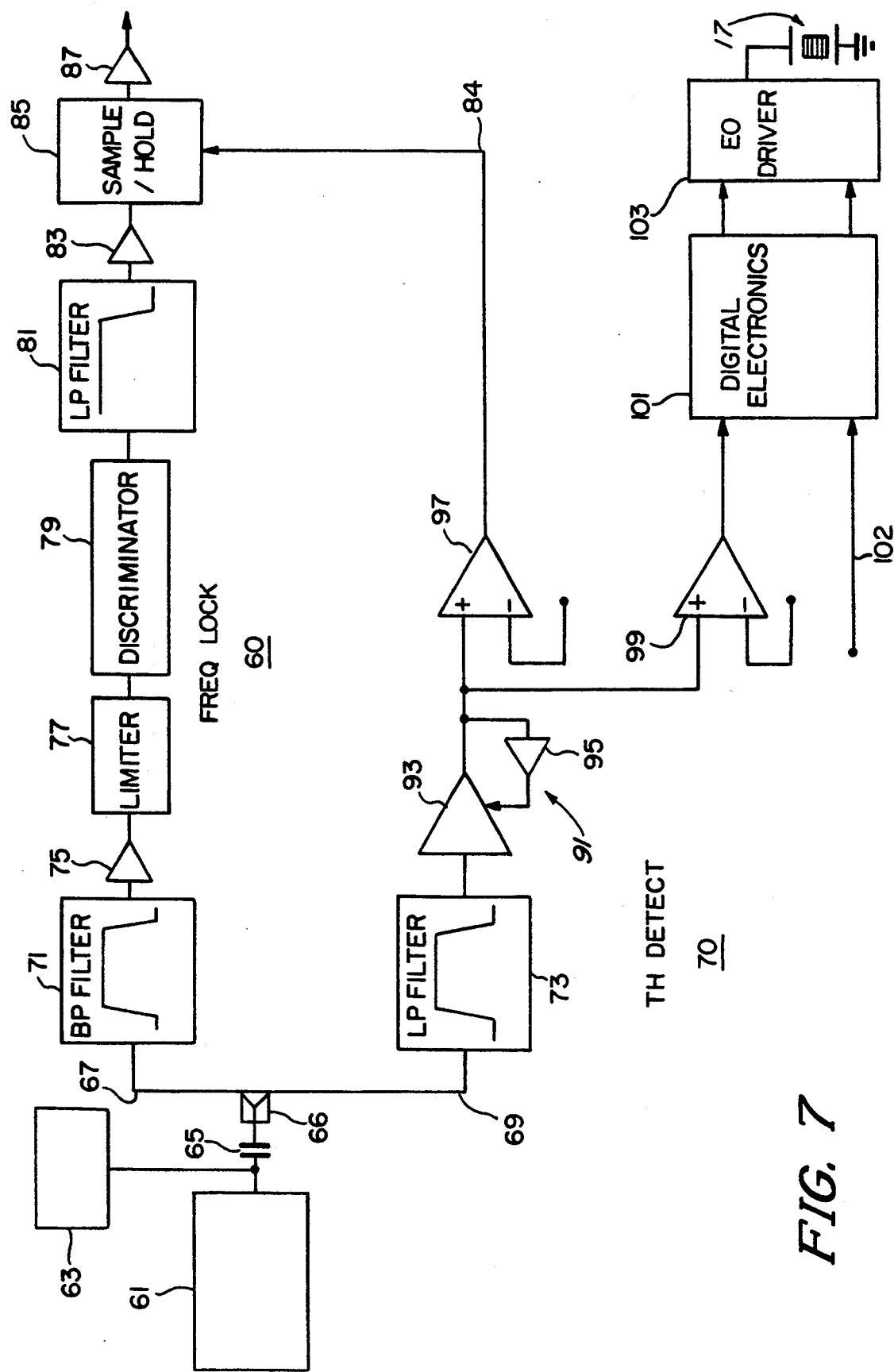
FIG. 7 is a circuit schematic diagram illustrating a cavity dump amplitude stabilization circuit according to the preferred embodiment.

FIG. 7 shows a cavity dump pulse amplitude stabilization circuit according to the preferred embodiment. A presently-known laser frequency control (LFC) device is frequency locked by coupling out part of the internal radiation through a 98% reflector (18, FIG. 1) onto an HgCdTe (MCT) heterodyne detector. According to the preferred embodiment, the same detector is used to implement the threshold detection. Accordingly, the circuit of FIG. 7 employs a mixing or heterodyning circuit including an MCT room temperature detector 61, a detector bias supply 63, a DC blocking capacitor 65 receiving the output of the detector 61, and a splitter 66.

Two circuit branches 60, 70 are supplied by outputs from the splitter 66 over respective leads 67, 69. These branches 60, 70 include a frequency-locking branch, generally denoted 60, and a threshold detect/amplitude stabilization branch, generally denoted 70.

The frequency-locking branch 60 includes a first band-pass filter 71, a first amplifier 75, an amplitude limiter 77, a delay-line frequency discriminator 79, a low pass filter 81, a second amplifier 83, a sample/hold circuit 85, and a third amplifier 87. The band-pass filter 71 has a 3-db bandwidth of 40-110 MHz and an intermediate frequency (IF) of 75 MHz.

The circuitry thus far described operates as follows: The MCT (mercury cadmium telluride) room temperature detector 61 receives two laser optical beams: the local oscillator (LO) laser beam and the transmitter laser Q-switch beam. The mixing of these two beams on the detector 61 results in an output containing two electronic signals. One signal is an RF pulse whose frequency is the difference of the two laser beams, and whose envelope is the shape of the Q-switch pulse. This signal is band-pass filtered by filter 71, amplified by amplifier 75, limited by limiter 77, and injected into the delay-line frequency discriminator 79 whose output voltage is proportional to IF frequency offset between the local oscillator and transmitter laser. The output of the discriminator 79 is a pulse amplitude, which is injected into the sample/hold circuit 85 and held until the next Q-switch pulse. A typical output of the discriminator 79 is a voltage limited between ±5 volts and which extends over a period of 200 nanoseconds (ns). The particular voltage constitutes a measure of frequency and is sampled and held by sample/hold circuit 85.

As noted, the amplitude held by sample/hold circuit 85 represents the frequency difference between the local oscillator and transmitter lasers. This frequency error signal is used to lock the two lasers together at the IF center frequency, as is well-known to those skilled in the art.

The amplitude stabilization branch 70 of the circuit of FIG. 7 includes a second band-pass filter 73, an automatic gain control circuit 91 connected to receive the output of the filter 73, first and second comparators 97, 99, digital electronics 101, and an EO driver 103. The second band-pass filter 73 is a low pass filter having a 3-db bandwidth of 10 Hz to 10 Mhz. Filter 73 thus rejects the RF component of the output of the splitter 66 and selects the Q-switch baseband, producing a Q-switch video pulse (e.g., 160, FIG. 9). The automatic gain control (AGC) circuit 91 receives the Q-switch video pulse and includes a main amplifier 93 and a feedback amplifier 95.

The first and second comparators 97, 99 each receive a respective first input from the output of the AGC circuit 91. The second input to the first comparator 97 is a reference level voltage selected for sample/hold timing generation. The second input to the second comparator 99 is a reference voltage selected for generation of the EO XTAL discharge pulse (i.e., cavity dump). The output of the first comparator 97 is connected to supply a sample timing signal to the sample/hold circuit 85 on line 84, while the second comparator 99 supplies a threshold detect pulse to the digital electronics 101. The second input to the digital electronics 101 is a laser fire pulse on input line 102.

The AGC 91 is employed because the Q-switch optical power on the detector 73 will slowly change with time. This power change would require the thresholds supplied to the first and second comparators 97, 99 to be adjusted in order to maintain the same cavity-dump timing and frequency sample/hold timing. The output of the AGC 91 is a stable amplitude Q-switch video pulse.

To summarize, the gain-adjusted Q-Switch video pulse from AGC 91 is supplied to the first and second comparators 97, 99. The first comparator 97 generates the sample/hold timing signal that is used to hold the frequency error voltage until the next pulse. The second comparator 99 generates a threshold detect pulse which results in termination of the quarter-wave voltage 28 (FIG. 3) applied to the EO XTAL 17. This circuit function is basic to the pulse amplitude stabilization concept.

Figure 8:
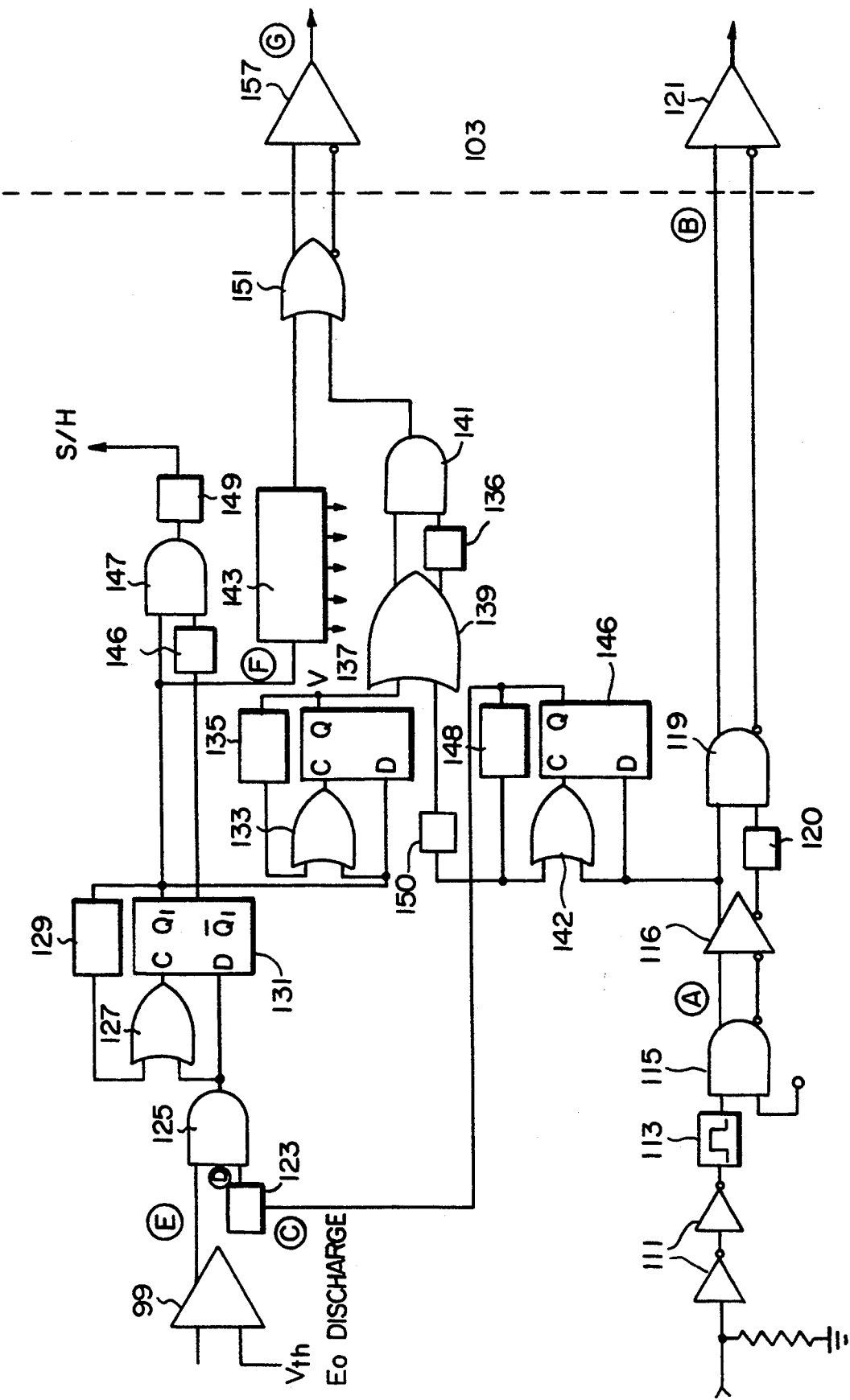
FIG. 8 is an electrical circuit diagram illustrating digital electronics according to the preferred embodiment.

The digital electronics 101 of FIG. 7 is concerned primarily with generating the EO CHARGE and EO DISCHARGE ECL pulses. An illustrative embodiment of the digital electronics circuitry 101 is shown in FIG. 8 and described in conjunction with the timing diagram of FIG. 9. The circuit of FIG. 8 also illustrates an approach to sample/hold timing generation which differs from that shown in FIG. 7, as will be discussed in further detail below.

Figure 9:
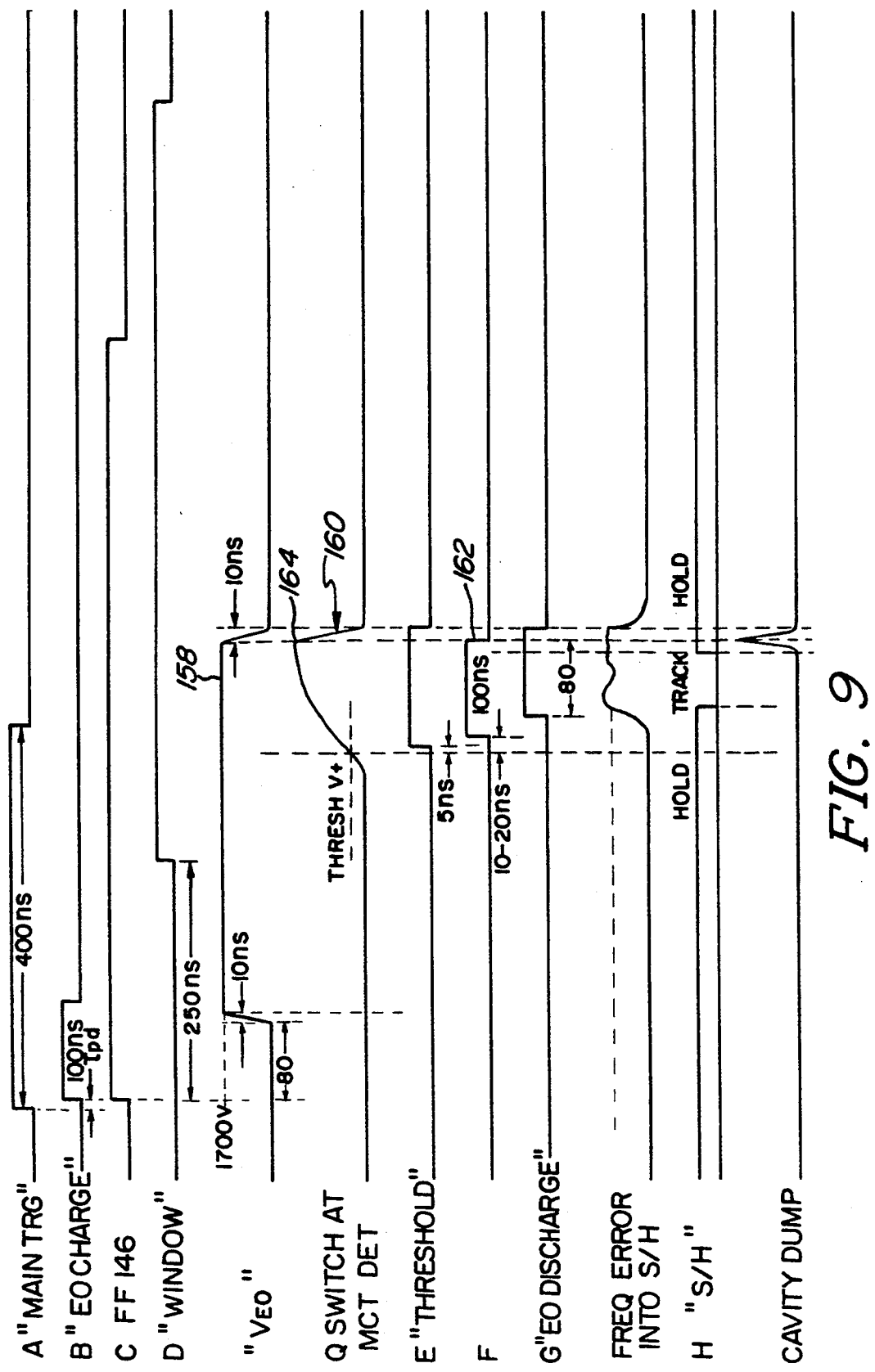
FIG. 9 is a timing diagram illustrative of operation of the preferred embodiment.

With reference to FIGS. 8 and 9, initially, the laser fire pulse is supplied to the input of a TTL Schmitt-trigger inverter 111, which supplies a second inverter 111. The second inverter 111 in turn supplies a TTL pulse-width controller 113, which generates a fixed pulse-width of 400 ns. The TTL output of the controller 113 is converted to a differential ECL output by the TTL to ECL converter 115. This signal is now transmitted as a 400-ns pulse-width differential ECL signal on a 50-ohm twinax cable. The line receiver 116 receives the transmitted differential ECL signal which is referred to as the "MAIN TRG" pulse on line A of FIG. 9.

The inverted ECL output of the ECL line receiver 116 is delayed 100 ns by a delay unit 120 and "anded" with the noninverted output of the receiver 116 by an AND gate 119. The output of the AND gate 119 is a 100-ns differential ECL pulse, which is referred to as EO CHARGE on line B of FIG. 9. The EO driver module 103 receives this pulse at line receiver 121 and converts it to a TTL pulse, which is used to switch the voltage across the EO crystal 17 from 0 vdc to +1700 vdc ("$V_{EO}$" of FIG. 9). When 1700V is across the EO crystal, the laser cavity is closed so that the laser energy starts to build up.

It will be observed that the EO charge pulse is generated after a slight propagation delay $t_{pd}$ from the generation of the main trigger on line A of FIG. 9. As shown on line "$V_{EO}$" of FIG. 9, when the EO CHARGE pulse rises, the signal "$V_{EO}$" applied to the EO crystal 17 is generated 80 ns later. The 80-ns delay is primarily the result of propagation delays through high voltage FETs in the EO driver circuitry 103. This delay is significant for the EO DISCHARGE pulse, but is not significant for the EO CHARGE pulse.

Simultaneously with the generation of the EO CHARGE pulse, a flip-flop 146 is set, as shown on line C of FIG. 9. The flip-flop 146 is reset after a delay determined by delay unit 148 through OR gate 142. After a delay of 250 ns provided by a delay unit 123, the second input of a third AND gate 125, shown on line D of FIG. 9, goes high in anticipation of threshold detection and subsequent generation of the EO DISCHARGE pulse.

As shown further in FIG. 9, line "$V_{EO}$," the EO voltage rises to 1700 volts in 10 ns. Approximately 270 ns after the EO voltage rises to 1700 volts, the Q-switch voltage 160 at the MCT detector 61 begins to rise. (The 270-ns time is dependent on laser cavity length and gain.) When the Q-switch voltage 160 reaches the threshold V+ input to the comparator 99, the threshold signal (line E, FIG. 9) is generated. Generation of this signal input to the first input of the third AND gate 125 sets the output of flip-flop 131 shown on line F of FIG. 9. As further shown on line F, the output of flip-flop 131 is reset after a 100-ns delay provided by operation of delay unit 129 and OR gate 127, thus generating a 100-ns pulse 162.

After a delay selected by delay unit 143, the 100-ns pulse 162 propagates through an OR gate 151 and an amplifier 157 and appears as the EO DISCHARGE pulse or signal, shown on line G of FIG. 9. After the 80-ns fixed delay of the EO driver 103, the generation of the EO DISCHARGE pulse results in the termination over a 10-ns period of the $V_{EO}$ pulse 158, shown on line $V_{EO}$ of FIG. 9. This results in the cavity dump shown on line I of FIG. 9 aligned in time with the peak 164 of the Q-switch video voltage 160. Flip-flop 137 and attendant gating 133, 139, 141, and delay units 135, 136 are provided as a safety feature to ensure that an EO discharge pulse is generated in the event that comparator 99 does not trigger generation of that pulse.

As noted above, FIG. 8 shows an alternative approach to the sample/hold signal generation. This approach employs a 50-ns delay unit 146, an AND gate 147, and a delay unit 149. The output Q1 of the flip-flop 131 is fed to a first input of the AND gate 147, while the opposite Q̄ output is fed through the 50-ns delay 146 to the second input of the AND gate 147. The delayed output of the AND gate 147 forms the sample/hold signal shown on line H of FIG. 9. During the 50-ns period shown in FIG. 9, the sample/hold circuitry tracks and then holds the new sample value. The approach of going to baseband to develop the Q-switch video pulse 160 ensures frequency lock, according to the approach of the preferred embodiment.

The approach shown in FIG. 7 of using a second comparator 97 to generate the sample/hold pulse is preferred, because it permits setting a second threshold level for more optimum positioning of the sample pulse. For example, the threshold voltage input V+ to the first comparator 99 may be 20 millivolts, whereas the threshold voltage input to the negative input of the second comparator 97 may be 0.5 volts. These thresholds, as well as various delays, could be made automatically digitally adjustable, if desired, to obtain optimal operation.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. Apparatus for stabilizing amplitude in a pulsed laser wherein a laser flux is generated and an output pulse is produced when said flux is dumped, comprising:
   indicating means for generating a control signal indicating that said laser flux has increased to a selected threshold; and
   means responsive to said control signal for causing said flux to be dumped.

2. The apparatus of claim 1 wherein said output pulse is produced by application of a Q-switch voltage to a Q-switch device, and wherein said laser comprises said Q-switch device and means for applying said Q-switch voltage.

3. The apparatus of claim 2 wherein said indicating means comprises:
   means for generating a Q-switch baseband video voltage pulse representative of said flux; and
   means for comparing said video voltage pulse to a selected threshold voltage and to produce said control signal.

4. The apparatus of claim 3 wherein said means responsive to said control signal comprises:
   timing circuit means for generating a Q-switch discharge pulse which terminates at the peak of said Q-switch video pulse.

5. The apparatus of claim 4 further comprising driver circuit means responsive to said Q-switch discharge pulse to terminate the voltage applied to said Q-switch.

6. The apparatus of claim 5 wherein said Q-switch voltage drops from 1700 volts to 0 volts when terminated.

7. The apparatus of claim 6 wherein said timing circuit means further includes means for generating a second control charge signal for causing said Q-switch voltage to change to a value selected to generate buildup of said laser flux.

8. The apparatus of claim 7 wherein said timing circuit means is responsive to said second control signal to thereafter enable production of said discharge signal.

9. The apparatus of claim 3 wherein said means for generating a Q-switch baseband video voltage pulse comprises:
   a heterodyne detector means for mixing a local oscillator laser beam and the pulsed output to produce a mixed signal; and
   filter means for producing said Q-switch baseband video pulse from said mixed signal.

10. The apparatus of claim 9 further including automatic gain control circuit means for producing a Q-switch video pulse of stable amplitude.

11. The apparatus of claim 9 further including:
   filter means for generating an RF pulse from said mixed signal;
   means for generating a discriminator voltage from said RF pulse which is representative of frequency difference between said local oscillator and said pulsed output;
   means for supplying said discriminator voltage; and
   means, responsive to said Q-switched baseband video pulse, for generating a sample/hold signal for frequency locking from said Q-switched baseband video pulse.

12. The apparatus of claim 3 further including means for generating a sample/hold signal for frequency locking from said Q-switch baseband video pulse.

13. A method of eliminating amplitude jitter in a waveguide laser employing intracavity laser flux generation and cavity dump laser pulse generation comprising the steps of:
sensing the intracavity laser flux; and
triggering the cavity dump to occur at the peak of said flux.

14. The method of claim 13 wherein the step of sensing includes the step of generating a baseband voltage signal representative of the level of said flux.

15. The method of claim 14 wherein the step of triggering includes the step of detecting when said baseband voltage signal reaches a selected reference voltage level.

16. An amplitude stabilization circuit for a laser wherein a flux buildup is controlled by an activation voltage applied to a laser Q-switch, comprising:
means for generating a Q-switch video pulse;
means for comparing said Q-switch video pulse to a reference signal and generating a control signal when the amplitude of said video pulse reaches that of said reference signal; and
means responsive to said control signal for terminating the activation voltage applied to the laser Q-switch.

17. A cavity dump laser, comprising:
a lasing medium;
a cavity containing said lasing medium, said cavity being closed to allow said lasing medium to build up an intracavity flux, said cavity being opened to allow said intracavity flux to be dumped from said cavity, and
control means for controlling said cavity to open and close, said cavity being closed when the intensity of said intracavity flux is increasing towards a threshold, said cavity being opened when said intensity of said intracavity flux reaches said threshold, whereby an output pulse is produced.

18. The laser of claim 17, wherein a Q-switch opens and closes said cavity, said Q-switch being closed in response to an applied voltage, wherein said controlling means includes:
indicating means for indicating when said intensity of said intracavity flux has reached said threshold; and
means for applying said voltage to said Q-switch, said voltage being applied when said cavity is to be closed, said voltage being removed when said indicating means indicates that said intracavity flux has reached said threshold.

19. The laser of claim 18, wherein said indicating means includes sensing means for generating a sensor signal that is proportional to said intensity; and comparing means for comparing said sensor signal to said threshold.

20. The laser of claim 19, wherein said threshold is a predetermined value that is supplied to said sensing means.

21. The laser of claim 17, wherein said threshold corresponds to maximum laser flux intensity.

* * * * *